United States Patent
Yastrebenetsky et al.

(10) Patent No.: US 10,609,113 B2
(45) Date of Patent: *Mar. 31, 2020

(54) SYSTEMS AND METHODS FOR TAG INSPECTION

(71) Applicant: InfoTrust, LLC, Blue Ash, OH (US)

(72) Inventors: Alexander Yastrebenetsky, Loveland, OH (US); Michael Loban, Cincinnati, OH (US); Andrew Christian Bengel, Cincinnati, OH (US)

(73) Assignee: InfoTrust, LLC, Blue Ash, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,922

(22) Filed: Oct. 22, 2018

(65) Prior Publication Data

US 2019/0058751 A1    Feb. 21, 2019

Related U.S. Application Data

(63) Continuation of application No. 15/862,129, filed on Jan. 4, 2018, now abandoned, which is a continuation of application No. 14/828,756, filed on Aug. 18, 2015, now Pat. No. 9,900,371.

(60) Provisional application No. 62/038,698, filed on Aug. 18, 2014.

(51) Int. Cl.
*H04L 29/08* (2006.01)
*G06F 16/951* (2019.01)

(52) U.S. Cl.
CPC ............ *H04L 67/02* (2013.01); *G06F 16/951* (2019.01)

(58) Field of Classification Search
None
See application file for complete search history.

(56) References Cited

U.S. PATENT DOCUMENTS

| | | |
|---|---|---|
| 7,092,934 B1 | 8/2006 | Mahan et al. |
| 8,904,278 B1 | 12/2014 | Anderson et al. |
| 9,900,371 B2 | 2/2018 | Yastrebenetsky et al. |
| 2006/0101514 A1 | 5/2006 | Milener et al. |
| 2007/0136806 A1 | 6/2007 | Berman |
| 2007/0220599 A1 | 9/2007 | Moen et al. |
| 2010/0262592 A1 | 10/2010 | Brawer et al. |
| 2010/0281008 A1 | 11/2010 | Braunwarth |
| 2011/0035486 A1 | 2/2011 | Seolas et al. |

(Continued)

FOREIGN PATENT DOCUMENTS

WO    2016028771 A1    2/2016

OTHER PUBLICATIONS

International Search Report received in International Application No. PCT/US2015/045681, dated Dec. 29, 2015, 2 pages.

(Continued)

*Primary Examiner* — Howard Cortes
(74) *Attorney, Agent, or Firm* — Ulmer & Berne LLP

(57) ABSTRACT

Technologies for identifying and inspecting web page tags include a tag inspection system. The tag inspection system receives configuration information, which includes a seed uniform resource locator. The tag inspection system accesses a web page corresponding to the seed uniform resource locator. A tag of the web page is invoked by the tag inspection system. Tag execution data is received in response to invocation of the tag of the web page. The received tag execution data is analyzed by the tag inspection system. A report is generated based on the analysis of the received tag execution data. Other embodiments are described and claimed.

20 Claims, 9 Drawing Sheets

(56) References Cited

U.S. PATENT DOCUMENTS

| | | |
|---|---|---|
| 2011/0041090 A1 | 2/2011 | Seolas et al. |
| 2011/0119220 A1 | 5/2011 | Seolas et al. |
| 2011/0185016 A1 | 7/2011 | Kandasamy et al. |
| 2012/0254333 A1 | 10/2012 | Chandramouli et al. |
| 2014/0052851 A1 | 2/2014 | Nielsen |
| 2014/0280012 A1 | 9/2014 | Feuerlein et al. |
| 2015/0302052 A1 | 10/2015 | Galameau et al. |
| 2016/0019600 A1 | 1/2016 | Smith |
| 2016/0048602 A1 | 2/2016 | Yastrebenetsky et al. |
| 2016/0323309 A1 | 11/2016 | Sethi et al. |
| 2016/0364771 A1 | 12/2016 | Nielsen et al. |
| 2018/0131747 A1 | 5/2018 | Yastrebenetsky et al. |

OTHER PUBLICATIONS

Written Opinion received in International Application No. PCT/US2015/045681, dated Dec. 29, 2015, 5 pages.

International Preliminary Report on Patentabilty received in International Application No. PCT/US2015/045681, dated Feb. 21, 2017, 6 pages.

| TAG NAME | ERROR DESCRIPTION | URL | POLICY |
|---|---|---|---|
| GOOGLE ANALYTICS | FAILED RULE SET | HTTP://WWW... | PG |
| SPOTXCHANGE | FAILED RULE SET | HTTP://WWW... | PG |
| LIJIT | TAG FOUND; NOT ON WHITE LIST | HTTP://WWW... | PG |
| DOUBLECLICK | TAG NOT FOUND; ON WHITE LIST | HTTP://WWW... | PG |
| GOOGLE ANALYTICS | FAILED RULE SET | HTTP://WWW... | PG |
| BRIGHTCOVE | TAG FOUND; TAG ON BLACK LIST | | |

FIG. 7

SYSTEMS AND METHODS FOR TAG INSPECTION

CROSS REFERENCE TO RELATED APPLICATIONS

The present application is a continuation of U.S. application Ser. No. 15/862,129, entitled "SYSTEMS AND METHODS FOR TAG INSPECTION," filed Jan. 4, 2018, which is a continuation of U.S. application Ser. No. 14/828,756, entitled "SYSTEMS AND METHODS FOR TAG INSPECTION," filed Aug. 18, 2015 and now U.S. Pat. No. 9,900,371, which claims the benefit of U.S. Provisional Application No. 62/038,698, entitled "SYSTEMS AND METHODS FOR TAG INSPECTION," filed Aug. 18, 2014, the disclosure of each of which is hereby incorporated herein by reference in its entirety.

TECHNICAL FIELD

Embodiments of the technology relate, in general, to inspection of tags in web pages, and in particular to systems and methods for identifying, inspecting, and analyzing marketing and analytic tags in web pages.

BRIEF DESCRIPTION OF THE DRAWINGS

The present disclosure will be more readily understood from a detailed description of some example embodiments taken in conjunction with the following figures:

FIG. 7 depicts an example report of tag alerts, according to one embodiment.

DETAILED DESCRIPTION

Figure 1:
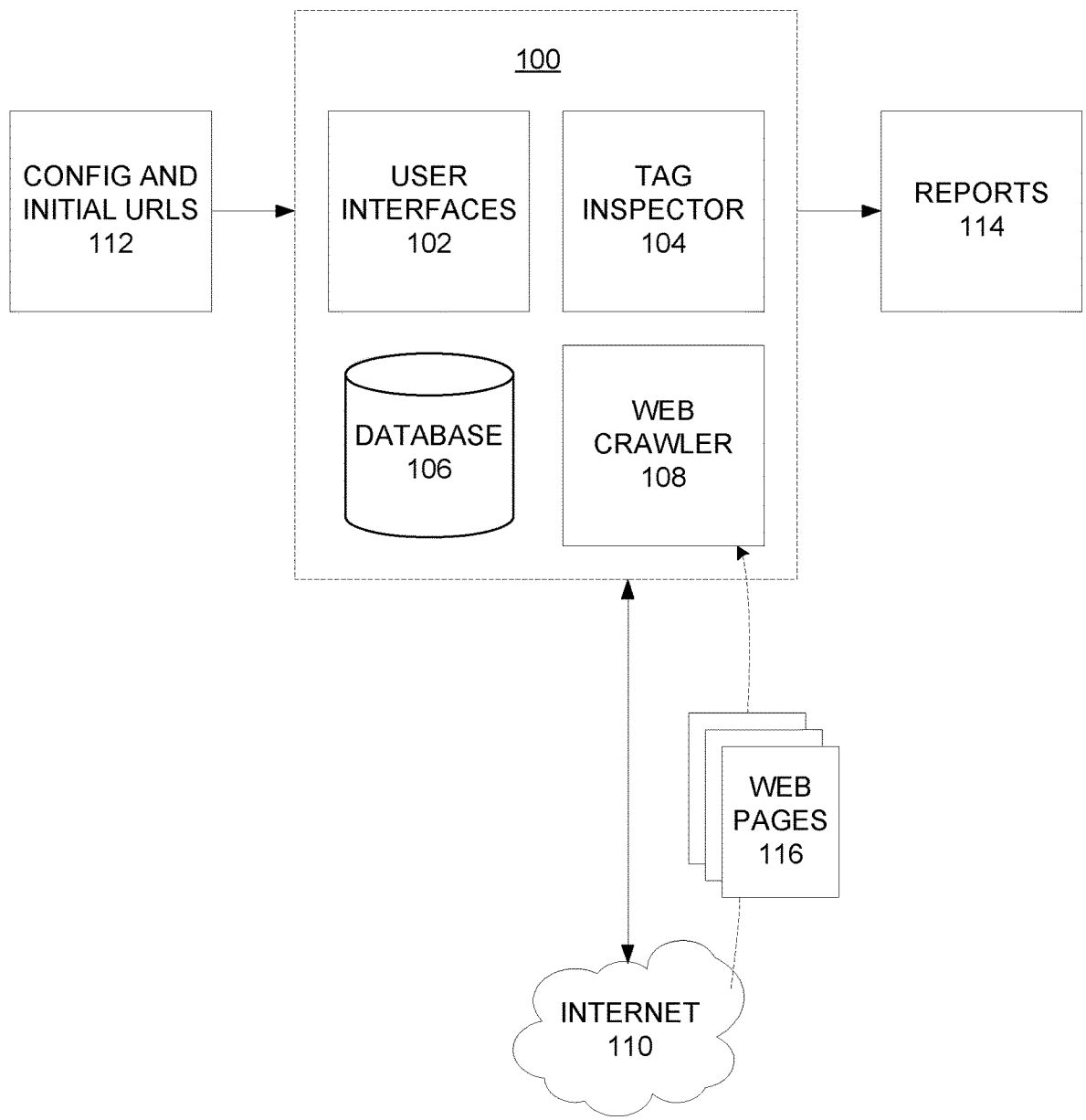
FIG. 1 depicts an example tag inspection system, according to one embodiment.

Various non-limiting embodiments of the present disclosure will now be described to provide an overall understanding of the principles of the structure, function, and use of the systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of systems and method for inspecting tags of web pages. Although the examples described systems and methods for inspecting tags in web pages, the systems and methods described herein can be used to identify, analyze, and inspect other metadata in web pages as well. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Referring to FIG. 1, an embodiment of a tag inspection system 100 is presented. The tag inspection system can include software modules such as a user interface module 102, a tag inspector module 104, and a web crawler module 108. Although they are described as separate modules, this is done for convenience and clarity of exposition only. In various configurations, the modules can be a single module, or further subdivided into multiple modules as would be understood in the art. The tag inspection system 100 can include one or more data stores such as a database 106. In an embodiment, the database 106 can execute on a remote server or a cloud-based server that is accessed over the Internet 110 using suitable communication channels and protocols. In embodiments, the Internet 110 can be an intranet or other suitable network. The web crawler module 108 can access web pages 116 using a data link to connect to networked systems, for example using HTML or hypertext markup language, FTP or file transfer protocol session, secure sockets, a VPN or virtual private network connection, and so forth. In an embodiment, the tag inspection system 100 can execute on a computing system that includes locally stored web pages, in which case a network need not be used.

The user interface module 102 can accept configuration information 112, such as rules for identifying marketing and analytic tags, scanning web pages 116 for tags, invoking tags, and crawling web pages 116. Configuration information 112 can include the initial URLs, called seed URLs, for the tag inspection system 100 to inspect. URLs or Uniform Resource Locators are web addresses used to access web pages across the Internet 110. Configuration information 112 can include preferences for generating reports 114. Configuration information 112 can be stored by the tag inspection system 100 in local memory, a data store, or a database 106. The user interface module 102 can accept other configuration data as would be understood in the art. Screens associated with the user interface module 102 are explained in greater detail below.

The user interface module 102 can be a web-based application or a stand-alone executable as would be appropriate for the particular implementation of the tag inspection system 100. For example, in one configuration a user of the tag inspection system 100 can use a web-browser, such as Safari™, Opera™, Google™ Chrome™, Internet Explorer™, or the like, that is executing on a computing device to access the user interface module 102 of the tag inspection system 100. In accordance with the present disclosure, the tag inspection system 100 can be accessed via any appropriate and suitable technique known or yet to be developed as would be understood by one of ordinary skill in the art.

In operation, the tag inspection system 100 provides a URL, for example an initial URL or seed URL, to the web crawler module 108. The URL can be configured by a user and stored as configuration information 112. The web crawler module 108 can retrieve a web page associated with the URL from the Internet 110 or another suitable network as described above. The web crawler module 108 can store, or cache, the web page in the database 106. The web crawler module 108 can use web crawling techniques to retrieve other web pages 116 that are linked to, or referenced in, the web page. For example, JavaScript™ can link to other pages; the web crawler module 108 can identify links in JavaScript™ files and retrieve additional webpages. The web crawler module can detect and track each tag present in a web page, and store each tag, web page, JavaScript™ file, and other related information in the database 106.

Tags, including tag management tags, can include instructions or code that when invoked can send analytic and marketing information about how a web page is being used. The web crawler module 108 can invoke one or more tags on one or more web pages 116. When a tag fires, the information sent by the tag can be collected by the tag inspection system 100. In a configuration, the web crawler module 108 invokes each tag on a web page or web pages 116. In a configuration, the web crawler module 108 invokes selected tags on web pages 116, for example tags associated with a third party vendor's tag management platform. The third party tag management system can collect information about the tags that fired and provide them to the tag inspection system 100.

The tag inspector module 104 can inspect and analyze the tags. The tag inspector module 104 can compare the tags to tags stored in a library of tags in the database 106. The tags that fire can be added to the library of tags in the database 106. Other information can be stored to the database 106, including but not limited to web pages 116 obtained by the web crawler module 108 and JavaScript™ files.

The tag inspector module 104 can generate reports 114. In various non-limiting configurations, one or more reports 114 can be generated based on, among other things, the tags that fired, cookies that were set by tags, piggybacking tags that were invoked from other tags, how the tags are configured on the web pages 116, the kinds of tags on each web page 116, which web pages 116 contain tags, and which web pages 116 do not include a particular type of tag, among other kids of reports. The reports 114 can be generated based on settings in the configuration information 112, or generated based on selected criteria from a user.

The software modules and database of the tag inspection system 100 can execute on one or more suitable computing platforms, for example PC, Mac or Linux based computers, such as a desktop computers, laptops, tablets, servers, or similar computing devices. The operations performed by each software module and the database 106 can be performed by a common server or servers, or executed across multiple servers as would be understood in the art. In embodiments, the software modules and database can include third-party software. The software modules can communicate over networks, such as the Internet 110, using any suitable communication channels and protocols including data links for wired network connections, wireless WiFi/802.11x connections, and mobile wireless communications.

Each software module can include software or other computer instructions executing on suitable computing hardware, such as a dedicated server, a personal computer, a server, multiple computers, a collection of networked computers, a cloud-based computer system, a web-based computer system, or from a storage device, as would be appropriate for the tag inspection system 100. Each computing device can include one or multiple processing units, such as central processing units and/or graphics processing units, may perform instructions stored in memory to execute the processes described herein.

Figure 2:
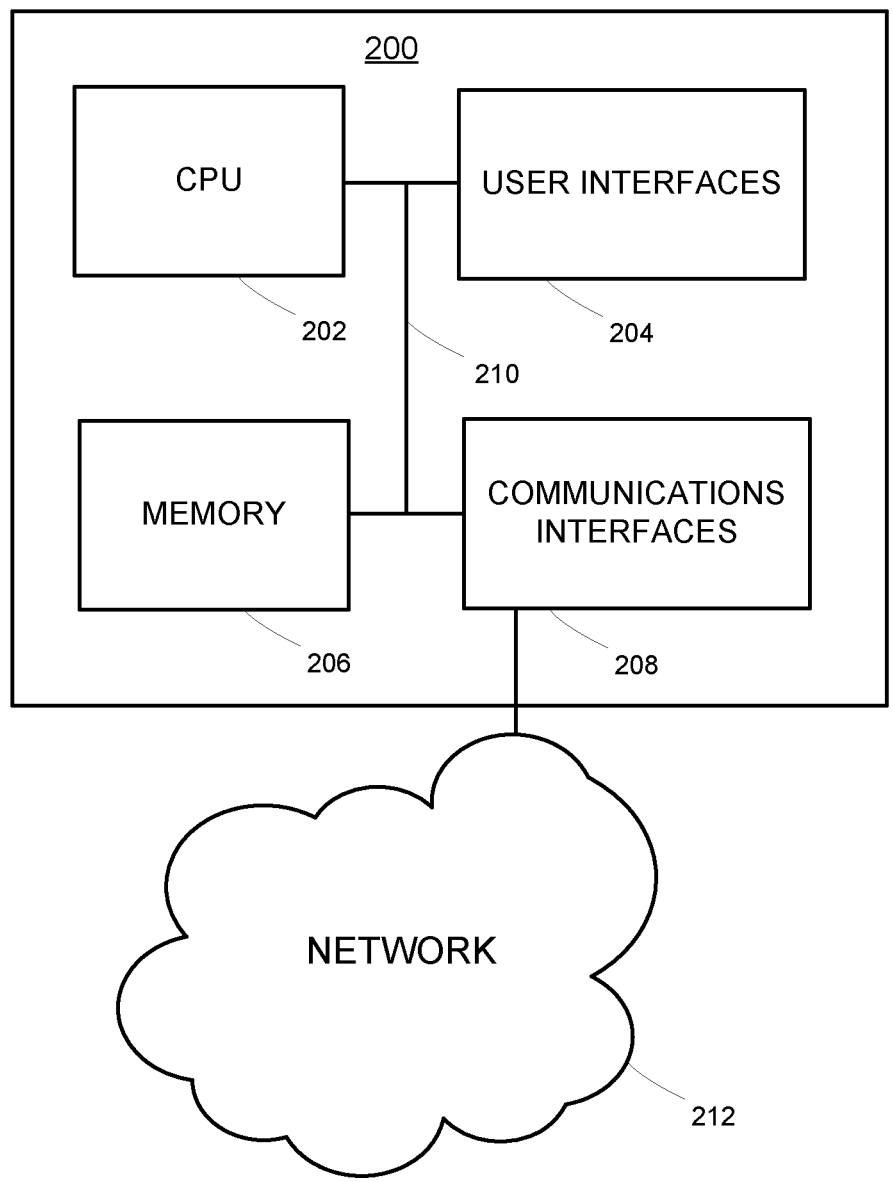
FIG. 2 depicts an example computing device, according to one embodiment.

Referring now to FIG. 2, an example computing device 200 is presented. The processes described herein can be performed on or between one or more computing devices 200. A computing device 200 can be a server, a computing device that is integrated with other systems or subsystems, a mobile computing device, a cloud-based computing capability, and so forth. For example, the computing device 200 depicted in FIG. 2 can be the tag inspection system 100 or a processor-based device that executes one or more of the software modules of the tag inspection system 100, a personal computing device of the user, and so forth. The computing device 200 can be any suitable computing device as would be understood in the art, including without limitation, a custom chip, an embedded processing device, a tablet computing device, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

Each computing device 200 includes one or more processors 202 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 200 also includes one or more memories 206, for example read only memory (ROM), random access memory (RAM), cache memory associated with the processor 202, or other memories such as dynamic RAM (DRAM), static RAM (SRAM), programmable ROM (PROM), electrically erasable PROM (EEPROM), flash memory, a removable memory card or disk, a solid state drive, and so forth. The computing device 200 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay™ disk, and so forth. Storage media such as flash drives, solid state hard drives, redundant array of individual disks (RAID), virtual drives, networked drives and other memory means including storage media on the processor 202, or memories 206 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 208 can be configured to transmit to, or receive data from, other computing devices 200 across a network 212. The network and communication interfaces 208 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 208 can include wired data transmission links such as Ethernet and TCP/IP. The communication interfaces 208 can include wireless protocols for interfacing with private or public networks 212. For example, the network and communication interfaces 208 and protocols can include interfaces for communicating with private wireless networks 212 such as a WiFi network, one of the IEEE 802.11x family of networks, or another suitable wireless network. The network and communication interfaces 208 can include interfaces and protocols for communicating with public wireless networks 212, using for example wireless protocols used by cellular network providers, including Code Division Multiple Access (CDMA) and Global System for Mobile Communications (GSM). A computing device 200 can use network and communication interfaces 208 to communicate with hardware modules such as a database or data store, or one or more servers or other networked computing resources. Data can be encrypted or protected from unauthorized access, for example by using secure sockets, virtual private networks, and so forth.

The computing device 200 can include a system bus 210 for interconnecting the various components of the computing device 200, or the computing device 200 can be integrated into one or more chips such as programmable logic device or application specific integrated circuit (ASIC). The system bus 210 can include a memory controller, a local bus, or a peripheral bus for supporting input and output devices associated with the user interfaces 204, and communication interfaces 208. Example input and output devices include keyboards, keypads, gesture or graphical input devices, motion input devices, touchscreen interfaces, one or more displays, audio units, voice recognition units, vibratory devices, computer mice, and any other suitable user interface.

The processor 202 and memory 206 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

Figure 3:
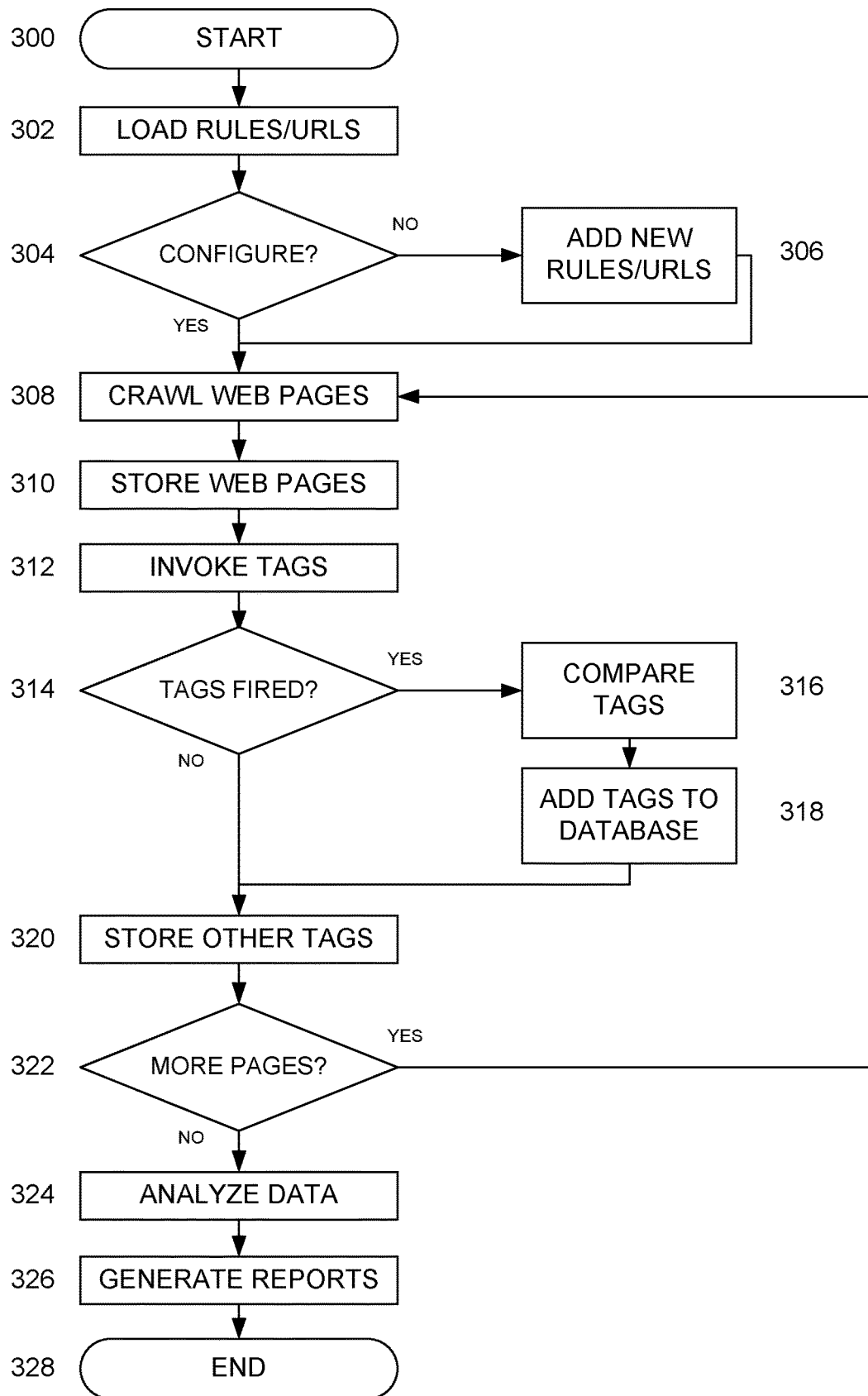
FIG. 3 depicts example operations of a tag inspection system, according to one embodiment.

Referring also now to FIG. 3, an example flow diagram of the operation of a tag inspection system 100 is presented. Processing starts at start block 300 where the tag inspection system 100 begins executing and continues to process block 302.

In process block 302, configuration information 112 for the tag inspection system 100 is loaded. The configuration information 112 can be loaded, for example, from a local data store, or a database 106. The configuration information 112 can include initial URLs, or seed URLs, for the tag inspection system 100 to begin scanning. The configuration information 112 can included scheduling information, for example to automatically begin scanning particular websites at a particular time, for example a periodic tag health scan performed once a week. The configuration information 112 can include rules, for example what kinds of tags to scan for in the web pages 116 retrieved from the URL or other web pages 116 that are linked to, or referenced in, the original web pages 116. The configuration information 112 can include preferences for generating reports 114. Processing continues to decision block 304.

In decision block 304, if a user of the tag inspection system 100 desires to enter additional configuration information, then processing continues to process block 306, otherwise processing continues to process block 308.

In process block 306 a user of the tag inspection system 100 can enter additional URLs, rules, and preferences into the tag inspection system 100 via a user interface 102. For example, a web page can be presented to the user that provides selectable options for the user to select and fields for the entry of URLs, rules, preferences or other data by the user. The configuration information selected and entered by the user can be stored, for example in the database 106. Processing continues to process block 308.

In process block 308, a web crawling engine of the tag inspection system 100 can retrieve web pages 116 of a website, for example a website at one of the initial URLs, or seed URLs. The tag inspection system 100 can virtually visit each web page 116, for example by receiving the web page 116. Processing continues to process block 310.

In optional process block 310, the tag inspection system 100 can optionally store a copy of the web page 116, or files referenced in the web page 116 such as JavaScript™ files, in the database 106 or in other memory or storage. Processing continues to process block 312.

In process block 312, the tag inspection system 100 can invoke tags in the web pages 116. The tags, when invoked, can execute instructions or code that cause an operation to be performed, for example reporting a user operation by sending data to a predetermined process, such as a port on a server associated with a tag management system. Processing continues to decision block 314.

In decision block 314, if tags fired, then processing continues to process block 316, otherwise processing continues to process block 320.

In process block 316, for tags that fired, the tag inspection system 100 or a tag management system, can compare the tag with other tags in the database 106, for example to determine if the tag is a known type of tag. Processing continues to process block 318.

In process block 318, tags that fired can be added to the database. Processing continues to process block 320.

In process block 320, the tag inspection system 100 can optionally store other tags to the database 106. Processing continues to decision block 322.

In decision block 322, if the crawling engine of the tag inspection system 100 determines that there are additional web pages 116 that are linked to, or referenced in, the current web page 116, then processing returns to process block 308 and the crawling engine of the tag inspection system 100 retrieves those web pages 116. Otherwise, processing continues to process block 324. In various embodiments, web crawling can continue until all possible paths in the web pages 116 have been virtually visited, or until a configurable rule in the configuration information 112 is triggered.

In process block 324, a tag inspection engine of the tag inspection system 100 can analyze the tags, web pages 116, JavaScript™ and other information stored in the database. Processing continues to process block 326.

In process block 326, the tag inspection engine of the tag inspection system 100 can generate reports based on the results of analyzing in process block 324. Example reports can include the tags that fired, cookies that were set by tags, piggybacking tags that were invoked from other tags, how the tags are configured on the web pages 116, the kinds of tags on each web page 116, which web pages 116 contain tags, and which web pages 116 do not include a particular type of tag, among other kids of reports. Processing terminates at end block 328.

Generally, the operations described in process blocks and decision blocks 300 through 328 can be performed in any suitable order, as would be understood by one of ordinary skill in the art.

The operations of a tag inspection system 100 can aid in automating the discovery and identification of tags firing on a website, such as the type of tags used to track user's actions on a website for marketing and analytic purposes. Manually inspecting web pages 116 can be difficult and time consuming. It can be especially challenging to find tags that piggyback off of other tags, for example those tags that invoke other tags. The tag inspection system 100 beneficially automates and simplifies the process of identifying all of the tags on web pages 116. For example, the tag inspection system 100 can be used to scan all of the web pages 116 in a domain, allowing a comprehensive analysis of a party's website. The tag inspection system 100 can be used to scan other vendors' websites for competitive analysis. The tag inspection system 100 can be scheduled to periodically monitor the tag status and health of a party's website, for example to ensure that the corrects tags remain on all of the necessary web pages 116 during the normal course of improvements, updates, and upgrades to the party's website.

As websites continue to grow in size and capability they can add new pages and require a large number of tags. Tag management systems, available from third party vendors, can be used to manage tags. Often, the tag management systems may be first used after a website already exists. During migration to a tag management system, old tags can be replaced with new tags that work with the tag management system. The reports generated by the tag inspection system 100 can assist in determining whether any old tags are present or if any tags are duplicated.

Figure 4:
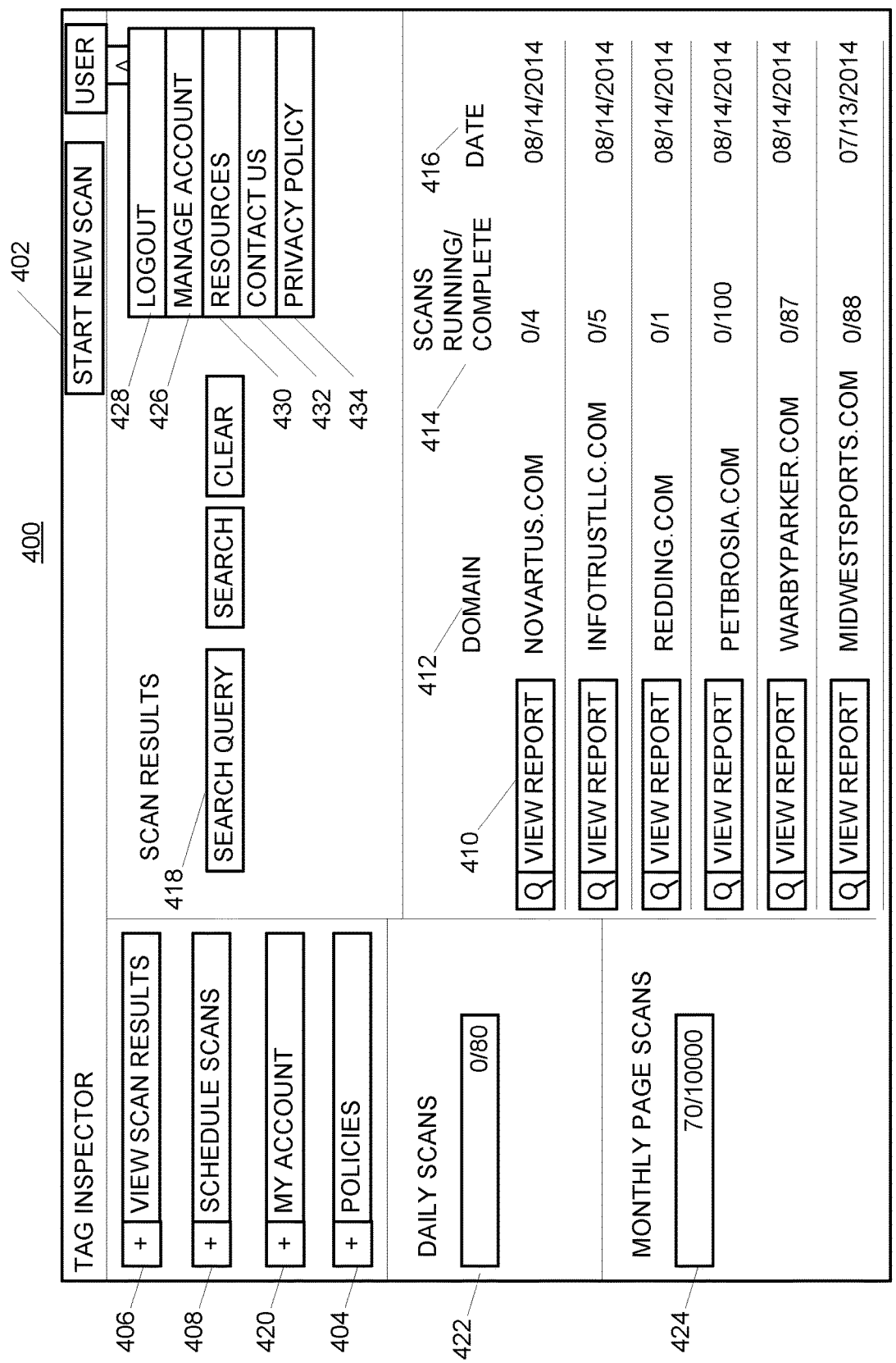
FIG. 4 depicts an example configuration screen of a user interface, according to one embodiment.

Referring now also to FIG. 4, an example configuration screen 400 of a tag inspection system 100 is illustrated. A start new scan button 402 allows the user to create a new scan of a domain or website. A policies and rules button 404 allows the user to set rules for scanning for tags. For example, the user may want to scan a website for all instances of tags that are Google Analytics tags. A view scans button 406 allows the user to view scans that have been performed. A schedule scans button 408 allows the user to edit or modify scans scheduled to be performed. Scan reports 410 for each of previously performed scans are listed for the user. The reports 410 are grouped by the domain 412 of the website that was scanned. The number of scans 414 that are currently running and that have previously run can be shown, as well as the date 416 of the last time the domain 412 was scanned. A search field 418 allows the user to search for a particular scan report 410. Account plan information is available to the user through an account button 420. The number of daily scans 422 and monthly scans 424 available to the user can be shown. The user can manage their account by selecting a manage account button 426. The user can log out of the system by selecting a logout button 428. Resources for tool usage can be accessed by selecting the resources button 430. Support can be reached by selecting the support button 432. The tag inspection system 100 privacy policy can be viewed by selecting the privacy polity button 434. Other tools, buttons, screens, and features can be included in a configuration screen 400 as would be understood by those familiar in the art.

Figure 5:
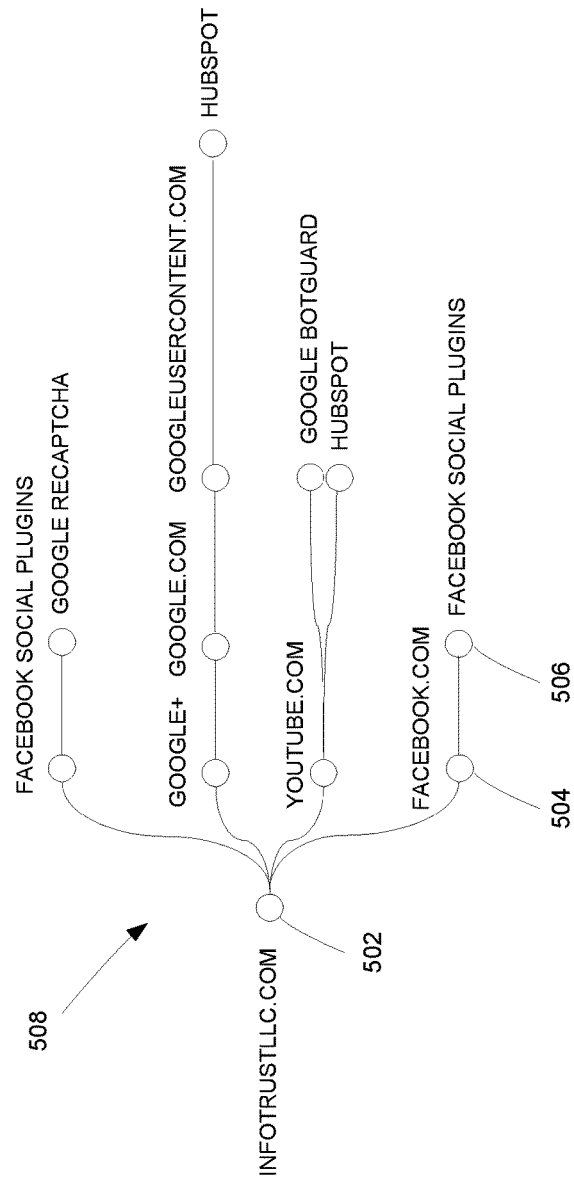
FIG. 5 depicts an example report that includes a visual map of invoked tags, according to one embodiment.

Referring now also to FIG. 5, an example report 500 that includes a visual map 508 of invoked tags on web pages 116 associated with a website 502 is illustrated. The website 502 includes tags 504 that are expressly invoked in the web pages 116 of the website 502. The tag inspection system 100 identifies piggybacking tags 506 that are invoked by other tags 504, 506. Because tags 504, 506 can invoke additional piggybacking tags 506, the visual map 508 can include multiple cascading levels.

Figure 6:
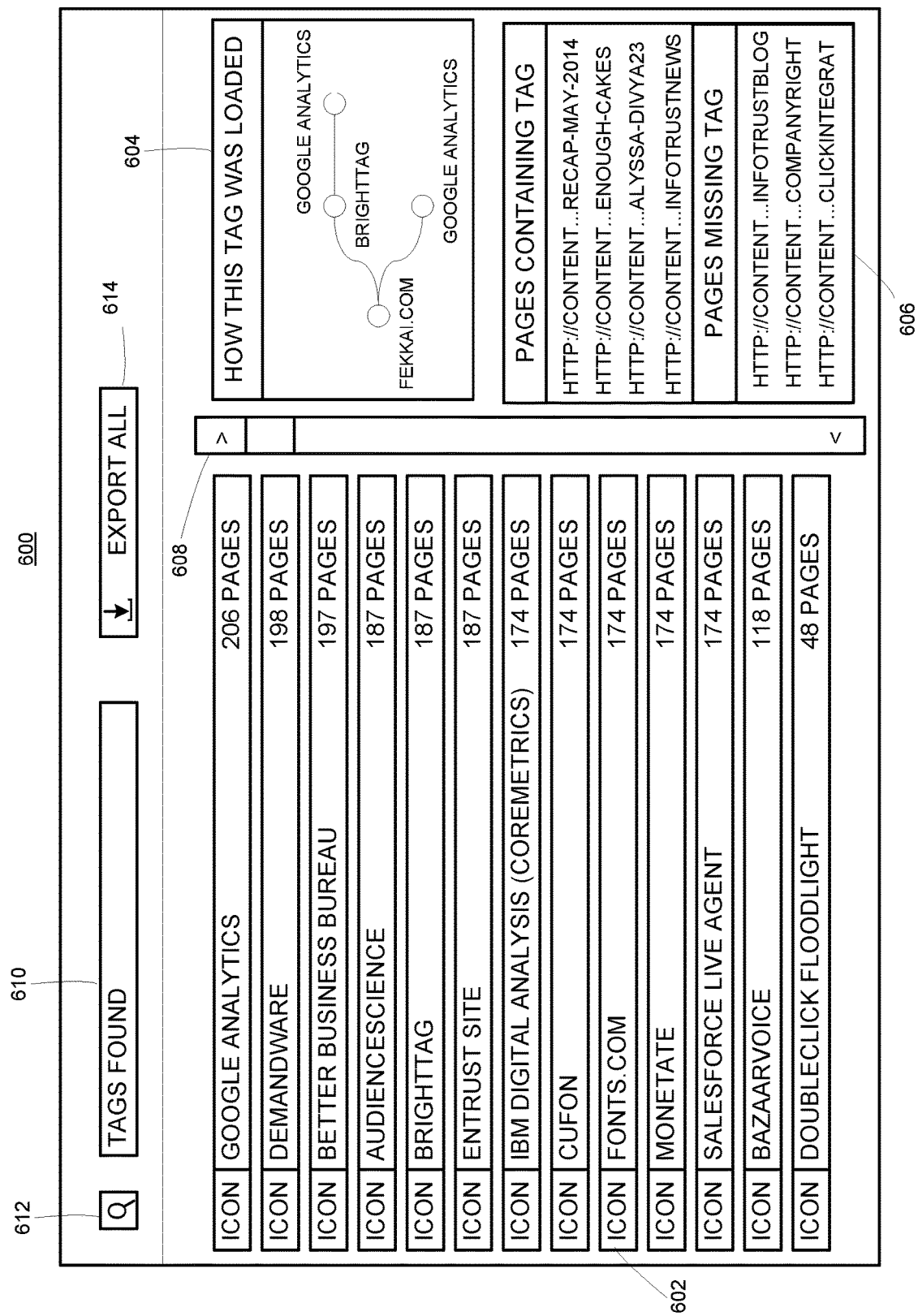
FIG. 6 depicts an example report that includes a list of tags sorted by frequency of appearance in the web pages of a website, according to one embodiment.

Referring now also to FIG. 6, an example report 600 that includes a list of tags 602 sorted by frequency of appearance in the web pages 116 of a website is illustrated. The report 600 includes a summary of all of the tags 602 present on a website. The tags 602 can be sorted, for example based on the number of web pages 116 the tag 602 appears on. The tag 602 can include an identifying icon, and be color coded or be partially filled as an indicator of the frequency with which the tag 602 appears in web pages 116. A header 610 provides a description of the report. A search tool 612 allows the user to search for a particular tag 602. A scrollbar 608 can allow a user to scroll through the list of tags 602. A tag 602 can be selected, and when selected a visual graphic 604 of how the selected tag 602 was loaded can be presented. Also when the tag 602 is selected, a list 606 of web pages 116 can be presented that shows which pages included the selected tag 602 and which pages did not include the selected tag 602. An export button 614 allows the user to export the report in a suitable form, for example a PDF or a comma-delimited list, or any other suitable format.

Referring now also to FIG. 7, an example report 700 of tag alerts is illustrated. The report 700 can provide a list of tags 702 on the scanned website that violated a rule. The rule can be configured by the user in the configuration information 112. The report 700 can include the tag 702, a description 704 of the error, the URL 706 associated with the tag, and the policy 708 associated with the rule. An example rule can be a white list of tags 702 allowed or required on the web pages 116 of the website. An error is generated if a required tag 702 is missing or a tag 702 is present that is not allowed on the web page 116. Another example rule can be a black list that contains tags 702 that are not allowed on the web site.

The tag inspector 104 also can provide real-time tag monitoring, permitting real-time insight into tag behavior on a website. Real-time tag monitoring can be implemented by placing a snippet of JavaScript™ (a 'tag') or multiple tags into pages of a website to be monitored. The tags can passively listen to other tags firing on the website while users are browsing pages of the website and interacting with elements of the pages. Each time another tag fires on a web page, the real-time tag can provide information about the tag that fired to the tag inspector 104. Real-time monitoring can determine the effect of tags firing on the website. Real-time tag inspection can provide indications of website performance degradation, load performance issues, and additional valuable information about the effects of tags on the website. Real-time tag analysis can provide information about which tags are firing, tags that are not loading, and so forth, in real time. Real-time tag analysis can provide performance measurements such as tag latency and page load times. Real-time tag analysis can provide information about how users are interacting with pages on the website. A real-time report can be generated showing which tags are firing on each page, what parameters are being passed by each tag, and what values are being populated in each parameter, including tags fired on event occurrences and pages where users are logged in or used anonymously.

Figure 8:
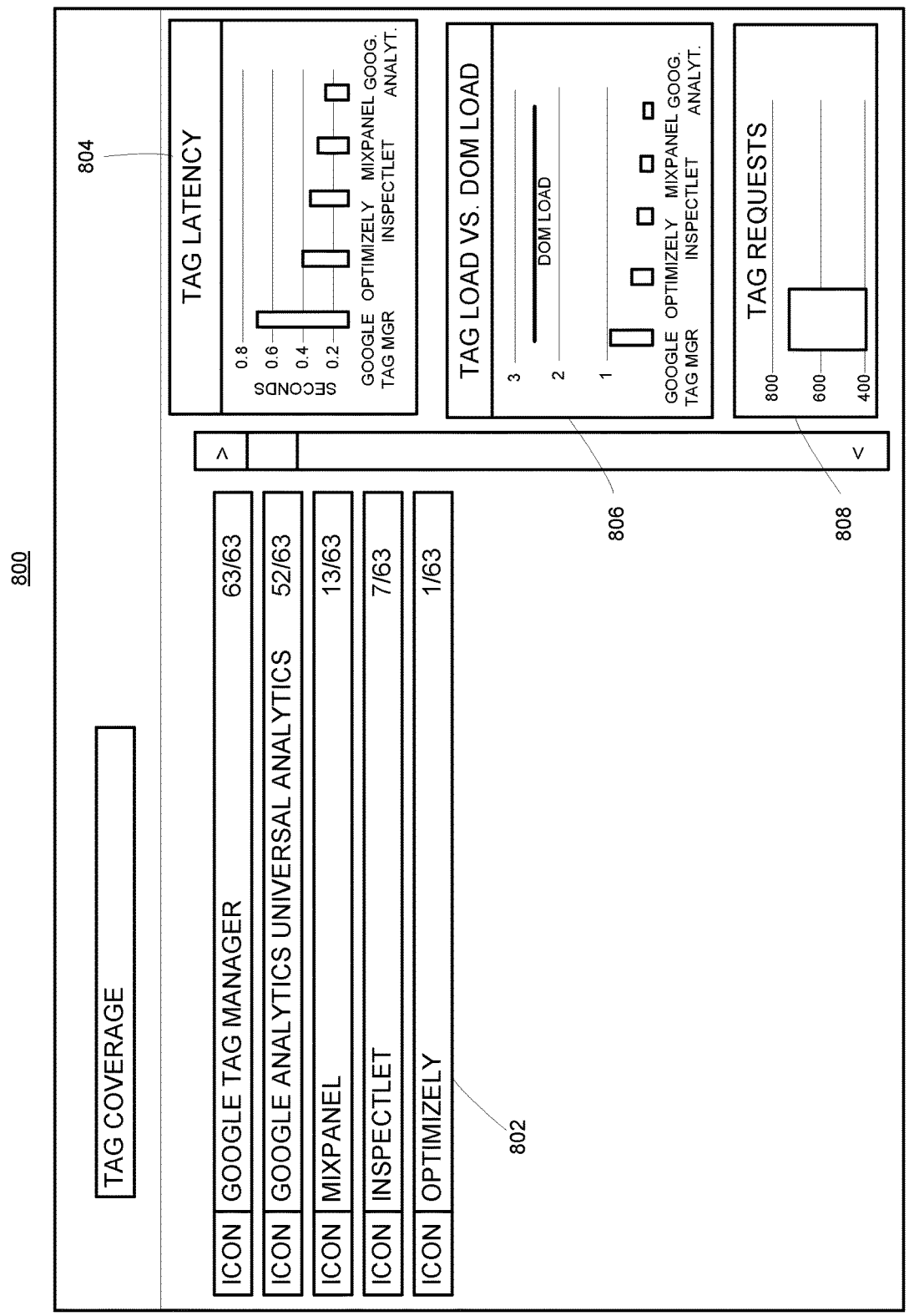
FIG. 8 depicts an example real-time report of tag information for tags firing on web pages, according to one embodiment.

Referring now also to FIG. 8, a tag inspector real-time dashboard 800 can provide a view of a website's performance. The dashboard 800 can provide a list of tags 802 firing on one or more pages. Information about one or more tags can be provided graphically. For example, the dashboard 800 can include a graphical representation of tag latency 804. In another example, the dashboard 800 can include a graphical representation of tag load versus another metric, such as document object model (DOM) load. In yet another example, the dashboard 800 can include a graphical representation of tag requests 808. Each graphical representation can be displayed in any suitable format, for example using a bar graph for each tag as illustrated. Additional graphical representations can include graphs of lag latency over a period of time, average tag latencies, average DOM loads, the number of tag requests over time, and so forth. Any suitable tag information can be displayed in real time. Example information can include, but is not limited to, page coverage for tags, tag latency, DOM load, tag load versus DOM load, tag requests, and so forth.

In an embodiment, the dashboard can include views over any suitable time period, for example a seven day time period or an administrator customizable date range. In an embodiment, an administrator can be registered to one or to multiple websites and allow an administrator to switch between data associated with each of the websites being monitored.

The tag inspector 104 can capture page coverage information. Page coverage information can include a capture of the number of pages that the tag is present on, which can be compared to the total number of pages on the website. This data can be useful for tracking purposes, allowing an administrator to recognize if tags are missing or present from any pages. Page coverage information therefore provides a straightforward way of recognizing any anomalies.

The tag inspector 104 can capture tag latency information. Tag latency can provide a useful metric of site performance. Some companies may require a threshold set up for the tag load time. Therefore, the ability to view latencies for all tags or a subset of tags on one screen advantageously can allow a system administrator to immediately see any outliers or non-compliant tags, or see which tags are performing better or worse than other tags. Furthermore, having information on tag latency can be provide a useful starting point for drilling down to pages where tags are being fired so as to investigate if tags could be affecting a page's load time.

The tag inspector 104 can capture DOM load information. Tag load can be compared to DOM load and can be used to verify that none of the tags are affecting DOM load time. For example, using tags are loaded asynchronously and therefore do not impact DOM load times. Therefore, when tag load time is correlated with DOM load time, a visualization of such a correlation can provide a useful indicator of a condition that may need to be addressed by a system administrator.

The tag inspector 104 can capture the number of tag requests. The number of tag requests can be compared with tag latency. If a large number of tag requests are correlated with a particular tag that has a high tag latency, this can indicate a condition that could be improved in order to improve a website's performance or otherwise alert a system administrator to a problem that needs to be addressed.

In an embodiment, if a system administrator clicks on one of the tags, additional detailed tag specific information about a tag can be presented, either graphically or in text form. A system administrator can click on a tag to retrieve additional detailed information about a tag in order to further investigate about a specific tag. For example, clicking on a tag name can cause the tag dashboard 800 to display information about that tag, such as a list of all of the URLs where that tag was found, specific pages instances for the pages when the tag was loaded, tag latency, load time, load time versus DOM time, and tag requests, among other suitable information such as visitor time stamps, the type of browser used to fire the tag (e.g., INTERNET EXPLORER, GOOGLE CHROME, SAFARI, etc.), the browser version, and information about the visitor such as country of origin.

In an embodiment, if a system administrator clicks on one of the pages, additional information about the page, tags on that page, and/or tags firing on that page can be presented to the system administrator, either graphically or in text form. In a first page-level example, the number of page loads can be presented, and can include for example the average DOM load or DOM completion time for each selected time or date range. Time and date range can be user selectable, and have any suitable granularity including data points spanning seconds, minutes, hours, days, etc. Multiple data graphs can be superimposed over one another, for example a line chart showing page loads can include another line chart showing average DOM completion time for each day in a selected date range. The charts can be produced for a single page or can be an aggregation of a number of pages. Pages can be searched, for example to find a specific page or to include a number of pages in the displayed results.

In another page-level example, a system administrator can be presented with tag related information, such as all of the tags firing for that specific page or of a selection of pages. Other tag related information can be provided, such as a tag category, for example page tracking tags or link attribution, start and/or end times, and so forth. Individual tags can be selected to present additional tag information such as tag parameter information such as parameter display names, parameter names, and corresponding tag values. Detailed tag specific information about a tag can be presented, either graphically or in text form.

The tag inspector 104 can also execute rules to validate data on a website or allow an administrator of obtain information about any condition of interest. For example, an administrator can set up a rule to determine if a tag fires upon the occurrence of a specific event. The system administrator could set up a rule that is triggered upon the occurrence of the event, and then validate the condition to be satisfied. The dashboard 800 can provide a rule creation feature, allowing system administrators to enter rules using a suitable syntax. In an embodiment, the dashboard can provide drop down boxes or other suitable widgets, syntax checkers, and help assistance to aid the system administrator in creating suitable rules.

For example, a system administrator can be provided with an entry box to give a rule a descriptive name, and a drop down box to select the condition to be validated. Example conditions can include, but are not limited to, a tag request, a global JavaScript™ variable, and a URL, among other suitable conditions such as custom variables or values of variables within an object. If tag request is selected, the system administrator can select conditions to be validated, for example trigger the rule if the tag is loaded on the page, when the tag is not loaded on the page, if the tag contains a particular parameter, if the parameter contains a value, and so forth. If a global JavaScript™ variable is selected by the system administrator, the user can enter the name of the variable and the value to be validated for triggering the rule. If a URL is selected, the URL can be validated and a rule triggered against any suitable information contained in the URL.

After selecting a condition, the system administrator can configure when the rule is to be applied. For example, the rule can be applied across all pages, a session landing page, for a first session referrer or a last session referrer, after a threshold number of user visits has occurred, after a threshold number of views for a specific user, based on page reference, based upon a global JavaScript™ variable, after a user clicks on a specific DOM element, and when the current URL meets a specific condition among other suitable options.

The results of the conditional rules can be logged and displayed in a validation errors section of the dashboard 800. A validation error, or validation result, can be selected by the system administrator to obtain additional information and details, including but not limited to the URL, type of browser, browser version, and timestamp.

Figure 9:
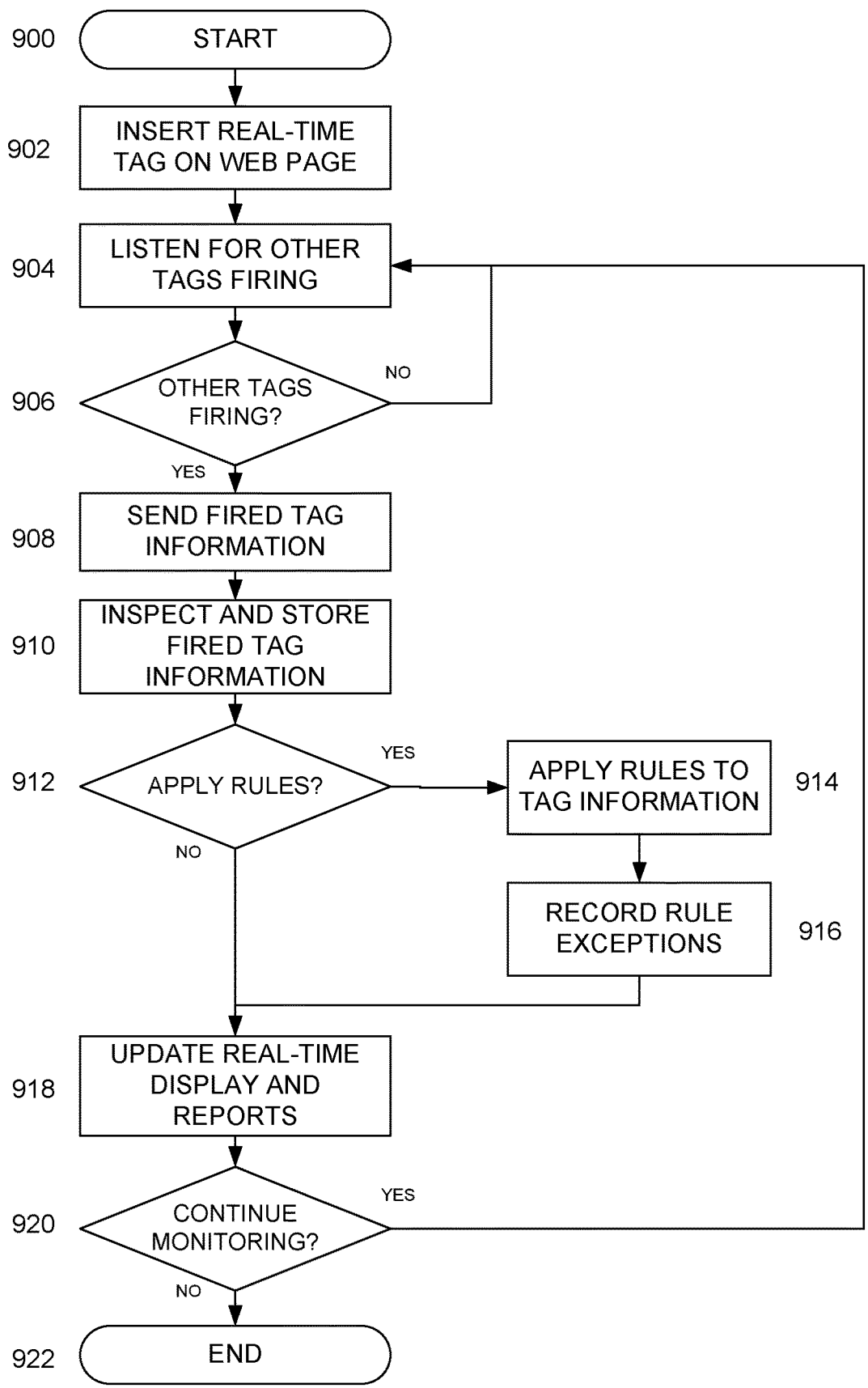
FIG. 9 depicts example operations of real-time tag monitoring, according to one embodiment.

Referring now also to FIG. 9, example operations of real-time tag monitoring are provided. Processing starts at start block 900 and continues to process block 902.

In process block 902, a real-time tag is added to a web page to be monitored. The web page is published or otherwise taken live. For example, a web page can be made accessible to Internet users by a system administrator. Processing continues to process block 904.

In process block 904, each real-time tag 'listens' for other tags firing on the respective web pages. Processing continues to decision block 906.

In decision block 906, if a tag fires on web page as describe above with regards to FIG. 8 and the accompanying detailed description, then processing continues to process block 908, otherwise processing continues back to process block 904 where the real-time tag continues to listen for tags firing.

In process block 908, the real-time tag forwards tag information about the tag that fired to the tag inspector 104. Processing continues to process block 910.

In process block 910, the tag inspector 104 inspects and stores information received about the fired tag from the real-time tag. For example, the tag inspector 104 can inspect information such as the tag name, time stamps, tag parameters, and tag values among other tag information. The tag inspector can use tag information to determine latency, the type of tag that was fired, and the type of user or browser than caused the tag to be fired, among other useful information as described in greater detail above with regard to FIG. 8 and the accompanying description. Processing continues to decision block 912.

In decision block 912, if a system administrator has configured rule to be applied to received tag information, then processing continues to process block 914, otherwise processing continues to process block 918.

In process block 914, the tag inspector 104 applies rules to the tag information. The rule can be applied to validate data generate additional information about any condition of interest as described in greater detail above with regard to FIG. 8 and the accompanying description. For example a rule can determine if a particular parameter contains one or more particular values, and can be further conditioned to only generate an exception upon a certain number of occurrences, as described above. Processing continues to process block 916.

In process block 916, the generated exceptions can be stored for use in updating the real-time display and any reports that are generated. Processing continues to process block 918.

In process block 918, the information received from the fired tags, and any rule exceptions, can be generated into an updated real-time report and/or displayed to a system administrator, for example on the dashboard 800 as described above for FIG. 8 and the accompanying description. Processing continues to decision block 920.

In decision block 920, if the system continues to monitor real-time tags, then processing continues back to process block 904 to continue listening for tags firing. Otherwise processing terminal at end bock 922.

In an embodiment, the present disclosure is directed, in part, to a method for identifying and inspecting web page tags, the method includes receiving, by a tag inspection system, configuration information. The configuration information includes seed uniform resource locator. The method further includes accessing, by the tag inspection system, a web page corresponding to the seed uniform resource locator and invoking, by the tag inspection system, a tag of the web page. The method also includes receiving, by the tag inspection system, tag execution data in response to invoking the tag of the web page and analyzing, by the tag inspection system, the received tag execution data. Additionally, the method includes, generating, by the tag inspection system, a report based on the analysis of the received tag execution data.

A method of the preceding embodiment, the method includes storing, by the tag inspection system, an electronic copy of the web page.

A method of one or more of the preceding embodiments, wherein the configuration information further includes scheduling data. Additionally, accessing the web page corresponding to the seed uniform resource locator includes accessing the web page corresponding to the seed uniform resource locator based on the scheduling data.

A method of one or more of the preceding embodiments, wherein the configuration information further includes one or more rules. Additionally, accessing the web page corresponding to the seed uniform resource locator includes accessing the web page corresponding to the seed uniform resource locator based on the one or more rules.

A method of one or more of the preceding embodiments, the method further includes scanning, by the tag inspection system, the web page corresponding to the seed uniform resource locator to identify one or more tags of the web page. In some embodiments of the method, the tag of the web page is one of the identified one or more tags of the web page.

A method of one or more of the preceding embodiments, wherein the configuration information further includes one or more rules indicative of a tag type. In some embodiments of the method, scanning the web page corresponding to the seed uniform resource locator to identify the one or more tags of the web page includes scanning, based on the one or more rules, the web page corresponding to the seed uniform resource locator to identify one or more tags of the web page having the tag type.

A method of one or more of the preceding embodiments, wherein the web page is a first web page, the tag is a first tag, and the tag execution data is first tag execution data. In some embodiments, the method further includes identifying, by the tag inspection system, a second web page related to the first web page and accessing, by the tag inspection system, the second web page related to the first web page. The method can further include invoking, by the tag inspection system, a second tag of the second web page and receiving, by the tag inspection system, second tag execution data in response to invoking the second tag of the second web page. Additionally, in some embodiments, the method further includes analyzing, by the tag inspection system, the received second tag execution data. In some embodiments of the method, generating the report includes generating the report based on the analysis of the received first and second tag execution data.

A method of one or more of the preceding embodiments, wherein identifying the second web page related to the first web page includes identifying a link of the first web page. In some embodiments of the method, the link includes a uniform resource locator corresponding to the second web page.

A method of one or more of the preceding embodiments, the method further includes identifying, by the tag inspection system, a piggybacking tag invoked by the tag of the web page and invoking, by the tag inspection system, the identified piggybacking tag. In some embodiments, the method further includes receiving, by the tag inspection system, additional tag execution data in response to invoking the identified piggybacking tag and analyzing, by the tag inspection system, the received additional tag execution data. In some embodiments of the method, generating the report includes generating a visual map based on the analysis of the received tag execution data and the received additional tag execution data, the visual map includes a visual indication of the tag, the piggybacking tag, and the relationship between the tag and the piggybacking tag.

A method of one or more of the preceding embodiments, wherein receiving tag execution data includes receiving, from a tag management system, the tag execution data in response to invoking the tag of the web page.

In another embodiment, the present disclosure is directed, in part, to a tag inspection system for identification and inspection of web page tags, the tag inspection system includes a web crawler module to receive configuration information. The configuration information includes a seed uniform resource locator. The web crawler module also to access a web page that corresponds to the seed uniform resource locator and invoke a tag of the web page. Additionally, the tag inspection system includes a tag inspector module to receive tag execution data in response to invocation of the tag of the web page, analyze the received tag execution data, and generate a report based on the analysis of the received tag execution data.

A tag inspection system of the preceding embodiment, wherein the web crawler module is further to store an electronic copy of the web page.

A tag inspection system of one or more of the preceding embodiments, wherein the configuration information further includes scheduling data. In some embodiments of the tag inspection system, to access the web page that corresponds to the seed uniform resource locator includes to access the web page that corresponds to the seed uniform resource locator based on the scheduling data.

A tag inspection system of one or more of the preceding embodiments, wherein the configuration information further includes one or more rules. In some embodiments of the tag inspection system, to access the web page that corresponds to the seed uniform resource locator includes to access the web page that corresponds to the seed uniform resource locator based on the one or more rules.

A tag inspection system of one or more of the preceding embodiments, wherein the web crawler module is further to scan the web page that corresponds to the seed uniform resource locator to identify one or more tags of the web page. In some embodiments, the tag of the web page is one of the identified one or more tags of the web page.

A tag inspection system of one or more of the preceding embodiments, wherein the configuration information further includes one or more rules indicative of a tag type. In some embodiments of the tag inspection system, to scan the web page that corresponds to the seed uniform resource locator to identify the one or more tags of the web page includes to scan, based on the one or more rules, the web page that corresponds to the seed uniform resource locator to identify one or more tags of the web page having the tag type.

A tag inspection system of one or more of the preceding embodiments, wherein the web page is a first web page, the tag is a first tag, and the tag execution data is first tag execution data. In some embodiments of the tag inspection system, the crawler module is further to identify a second web page related to the first web page, access the second web page related to the first web page, and invoke a second tag of the second web page. Additionally, in some embodiments of the tag inspection system, the tag inspector module is further to receive second tag execution data in response to invocation of the second tag of the second web page and analyze the received second tag execution data. Further, in some embodiments of the tag inspection system, to generate the report includes to generate the report based on the analysis of the received first and second tag execution data.

A tag inspection system of one or more of the preceding embodiments, wherein to identify the second web page related to the first web page includes identifying a link of the first web page. In some embodiments, the link includes a uniform resource locator that corresponds to the second web page.

A tag inspection system of one or more of the preceding embodiments, wherein the web crawler module is further to identify a piggybacking tag invoked by the tag of the web page and invoke the identified piggybacking tag. In some embodiments of the tag inspection system, the tag inspector module is further to receive additional tag execution data in response to invocation of the identified piggybacking tag and analyze the received additional tag execution data. Additionally, in some embodiments of the tag inspection system, to generate the report includes to generate a visual map based on the analysis of the received tag execution data and the received additional tag execution data. In some embodiments, the visual map includes a visual indication of the tag, the piggybacking tag, and the relationship between the tag and the piggybacking tag.

A tag inspection system of one or more of the preceding embodiments, wherein to receive tag execution data includes to receive, from a tag management system, the tag execution data in response to invocation of the tag of the web page.

In another embodiment, the present disclosure is directed, in part, to a system for identification and inspection of web page tags, the system includes a tag inspection server having a processor executing instructions stored in memory, wherein the instructions cause the processor to receive configuration information. The configuration information includes a seed uniform resource locator. The instructions further cause the processor to access a web page that corresponds to the seed uniform resource locator, invoke a tag of the web page, and receive tag execution data in response to invocation of the tag of the web page. Additionally, the instructions cause the processor to analyze the received tag execution data and generate a report based on the analysis of the received tag execution data.

A system of the preceding embodiment, wherein the instructions of the tag inspection server further cause the processor to store an electronic copy of the web page.

A system of one or more of the preceding embodiments, wherein the configuration information further includes scheduling data. In some embodiments of the system, to access the web page that corresponds to the seed uniform resource locator includes to access the web page that corresponds to the seed uniform resource locator based on the scheduling data.

A system of one or more of the preceding embodiments, wherein the configuration information further includes one or more rules. In some embodiments of the system, to access the web page that corresponds to the seed uniform resource locator includes to access the web page that corresponds to the seed uniform resource locator based on the one or more rules.

A system of one or more of the preceding embodiments, wherein the instructions of the tag inspection server further cause the processor to scan the web page that corresponds to the seed uniform resource locator to identify one or more tags of the web page. In some embodiments of the system, the tag of the web page is one of the identified one or more tags of the web page.

A system of one or more of the preceding embodiments, wherein the configuration information further includes one or more rules indicative of a tag type. In some embodiments of the system, to scan the web page that corresponds to the seed uniform resource locator to identify the one or more tags of the web page includes to scan, based on the one or more rules, the web page that corresponds to the seed uniform resource locator to identify one or more tags of the web page having the tag type.

A system of one or more of the preceding embodiments, wherein the web page is a first web page, the tag is a first tag, and the tag execution data is first tag execution data. In some embodiments of the system, the instructions of the tag inspection server further cause the processor to identify a second web page related to the first web page, access the second web page related to the first web page, and invoke a second tag of the second web page. In some embodiments of the system, the instructions of the tag inspection server also cause the processor to receive second tag execution data in response to invocation of the second tag of the second web page and analyze the received second tag execution data. Additionally, in some embodiments of the system, to generate the report includes to generate the report based on the analysis of the received first and second tag execution data.

A system of one or more of the preceding embodiments, wherein to identify the second web page related to the first web page includes identifying a link of the first web page. In some embodiments, the link includes a uniform resource locator that corresponds to the second web page.

A system of one or more of the preceding embodiments, wherein the instructions of the tag inspection server further cause the processor to identify a piggybacking tag invoked by the tag of the web page, invoke the identified piggybacking tag, receive additional tag execution data in response to invocation of the identified piggybacking tag, and analyze the received additional tag execution data. In some embodiments of the system, to generate the report includes to generate a visual map based on the analysis of the received tag execution data and the received additional tag execution data. In some embodiments of the system, the visual map includes a visual indication of the tag, the piggybacking tag, and the relationship between the tag and the piggybacking tag.

A system of one or more of the preceding embodiments, wherein to receive tag execution data includes to receive, from a tag management server, the tag execution data in response to invocation of the tag of the web page.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

We claim:

1. A method of identifying and inspecting web page tags, the method comprising:

invoking, by a tag inspection system, a tag of a web page;

receiving, by the tag inspection system, tag execution data in response to invoking the tag of the web page;

analyzing, by the tag inspection system, the received tag execution data;

identifying, by the tag inspection system, a piggybacking tag invoked by the tag of the web page;

invoking, by the tag inspection system, the identified piggybacking tag;

receiving, by the tag inspection system, additional tag execution data in response to invoking the identified piggybacking tag;

analyzing, by the tag inspection system, the received additional tag execution data; and generating, by the tag inspection system, a visual map based on the analysis of the received tag execution data and the received additional tag execution data, the visual map comprises a visual indication of the tag, the piggybacking tag, and a relationship between the tag and the piggybacking tag.

2. The method of claim 1, further comprising storing, by the tag inspection system, an electronic copy of the web page.

3. The method of claim 1, further comprising accessing, by the tag inspection system, the web page based on scheduling data.

4. The method of claim 1, further comprising accessing, by the tag inspection system, the web page based on one or more rules.

5. The method of claim 1, wherein the one or more rules comprise any of a white list rule and a black list rule.

6. The method of claim 1, further comprising scanning, by the tag inspection system, the web page to identify one or more tags of the web page, wherein the tag of the web page comprises one of the identified one or more tags of the web page.

7. The method of claim 6, wherein scanning the web page to identify the one or more tags of the web page comprises scanning, based on one or more rules indicative of a tag type, the web page to identify one or more tags of the web page comprising the tag type.

8. The method of claim 1, wherein the web page comprises a first web page, the tag comprises a first tag, and the tag execution data comprises first tag execution data; and further comprising:

identifying, by the tag inspection system, a second web page related to the first web page;

invoking, by the tag inspection system, a second tag of the second web page;

receiving, by the tag inspection system, second tag execution data in response to invoking the second tag of the second web page;

analyzing, by the tag inspection system, the received second tag execution data; and wherein generating the visual map comprises generating the visual map based on the analysis of the received first tag execution data, the received second tag execution data, and the received additional tag execution data.

9. The method of claim 8, wherein identifying the second web page related to the first web page comprises identifying a link of the first web page, the link comprises a uniform resource locator corresponding to the second web page.

10. The method of claim 1, wherein receiving tag execution data comprises receiving, from a tag management system, the tag execution data in response to invoking the tag of the web page.

11. A tag inspection system for identification and inspection of web page tags, the tag inspection system comprising:
a processor executing instructions stored in memory, wherein the instructions cause the processor to:
invoke a tag of a web page;
receive tag execution data in response to invocation of the tag of the web page;
analyze the received tag execution data;
identify a piggybacking tag invoked by the tag of the web page;
invoke the identified piggybacking tag;
receive additional tag execution data in response to invocation of the identified piggybacking tag;
analyze the received additional tag execution data; and
generate a visual map based on the analysis of the received tag execution data and the received additional tag execution data, the visual map comprises a visual indication of the tag, the piggybacking tag, and a relationship between the tag and the piggybacking tag.

12. The tag inspection system of claim 11, wherein the instructions further cause the processor to store an electronic copy of the web page.

13. The tag inspection system of claim 11, wherein the instructions further cause the processor to access the web page based on scheduling data.

14. The tag inspection system of claim 11, wherein the instructions further cause the processor to access the web page based on one or more rules.

15. The tag inspection system of claim 14, wherein the one or more rules comprise any of a white list rule and a black list rule.

16. The tag inspection system of claim 11, wherein the instructions further cause the processor to scan the web page to identify one or more tags of the web page, wherein the tag of the web page comprises one of the identified one or more tags of the web page.

17. The tag inspection system of claim 16, wherein to scan the web page to identify the one or more tags of the web page comprises to scan, based on one or more rules indicative of a tag type, the web page to identify one or more tags of the web page that comprise the tag type.

18. The tag inspection system of claim 11, wherein the web page comprises a first web page, the tag comprises a first tag, and the tag execution data comprises first tag execution data;
wherein the instructions further cause the processor to (i) identify a second web page related to the first web page, (ii) invoke a second tag of the second web page, (iii) receive second tag execution data in response to invocation of the second tag of the second web page, and (iv) analyze the received second tag execution data; and
wherein to generate the visual map comprises to generate the visual map based on the analysis of the received first tag execution data, the received second tag execution data, and the received additional tag execution data.

19. The tag inspection system of claim 18, wherein to identify the second web page related to the first web page comprises to identify a link of the first web page, the link comprises a uniform resource locator that corresponds to the second web page.

20. The tag inspection system of claim 11, wherein to receive tag execution data comprises to receive, from a tag management system, the tag execution data in response to invocation of the tag of the web page.

* * * * *